US010054308B2

(12) United States Patent
Berros et al.

(10) Patent No.: US 10,054,308 B2
(45) Date of Patent: Aug. 21, 2018

(54) METHOD FOR GENERATING STEAM FROM RAW WATER, IN PARTICULAR FROM BLOW DOWN WATER COMING FROM A STEAM GENERATOR

(71) Applicants: INGENICA INGENIERIE INDUSTRIELLE, Guyancourt (FR); Brais Malouin and Associates Inc., St-Laurent, Quebec (CA)

(72) Inventors: Jeremy Berros, Le Tremblay sur Mauldre (FR); Peter Tye, Beaconsfield (CA)

(73) Assignees: INGENICA INGENIERIE INDUSTRIELLE, Guyancourt (FR); BRAIS MALOUIN AND ASSOCIATES INC., St-Laurent (CA)

( * ) Notice: Subject to any disclaimer, the term of this patent is extended or adjusted under 35 U.S.C. 154(b) by 370 days.

(21) Appl. No.: 14/851,571

(22) Filed: Sep. 11, 2015

(65) Prior Publication Data

US 2016/0076760 A1    Mar. 17, 2016

(30) Foreign Application Priority Data

Sep. 11, 2014   (FR) ..................... 14 58553

(51) Int. Cl.
*F22B 37/56*      (2006.01)
*B01D 21/00*      (2006.01)
(Continued)

(52) U.S. Cl.
CPC ............ *F22B 37/565* (2013.01); *B01D 21/00* (2013.01); *F22B 3/04* (2013.01); *F22B 29/02* (2013.01); *F22B 37/486* (2013.01); *F22B 37/54* (2013.01)

(58) Field of Classification Search
CPC ............................. F22B 37/565; F22B 29/02
See application file for complete search history.

(56) References Cited

U.S. PATENT DOCUMENTS 3,298,359 A    1/1967  West et al.
3,353,593 A   11/1967  Boberg
(Continued)

FOREIGN PATENT DOCUMENTS

CN          2811757 Y      8/2006
EP        1 116 862 A2     7/2001
(Continued)

OTHER PUBLICATIONS

French Search Report, dated May 13, 2015, from corresponding French Application.

*Primary Examiner* — Nathaniel Herzfeld
(74) *Attorney, Agent, or Firm* — Young & Thompson

(57) ABSTRACT

The method includes: (A) directing a feed water in the liquid phase of an instant expansion tank; (B) in the instant expansion tank, heating the feed water by mixing with the recycled stream from step (E); (C) compressing again at a high pressure the liquid fraction in the instant expansion tank and sending the liquid fraction to the inlet of a heat exchanger or group of heat exchangers connected in series; (D) heating the non-expanded fraction in the heat exchanger (s) while maintaining the non-expanded fraction in the liquid state; (E) recycling the stream from step (D) in the instant expansion tank; (F) in the instant expansion tank, expanding the fraction from step (E) and generating by instant expansion a stream of the searched steam containing the mineral materials of the feed water remaining in solution; and (G) separating the solid particles formed as a blowdown containing water and the particles.

12 Claims, 1 Drawing Sheet

(51) Int. Cl.
    *F22B 3/04*     (2006.01)
    *F22B 37/48*     (2006.01)
    *F22B 37/54*     (2006.01)
    *F22B 29/02*     (2006.01)

(56) References Cited

U.S. PATENT DOCUMENTS

| | | | |
|---|---|---|---|
| 2010/0200231 A1* | 8/2010 | Minnich | E21B 43/24 166/272.3 |
| 2012/0297774 A1 | 11/2012 | Uji | |
| 2014/0262258 A1* | 9/2014 | Berros | C02F 9/00 166/272.3 |
| 2015/0000914 A1* | 1/2015 | Mandigo | C02F 1/041 166/303 |

FOREIGN PATENT DOCUMENTS

| | | |
|---|---|---|
| FR | 1480893 A | 5/1967 |
| FR | 1492517 A | 8/1967 |
| GB | 2 337 210 A | 11/1999 |
| JP | 2009-97790 A | 5/2009 |
| WO | 2009/071981 A2 | 6/2009 |
| WO | 2011/102408 A1 | 8/2011 |
| WO | 2014/140469 A2 | 9/2014 |

\* cited by examiner

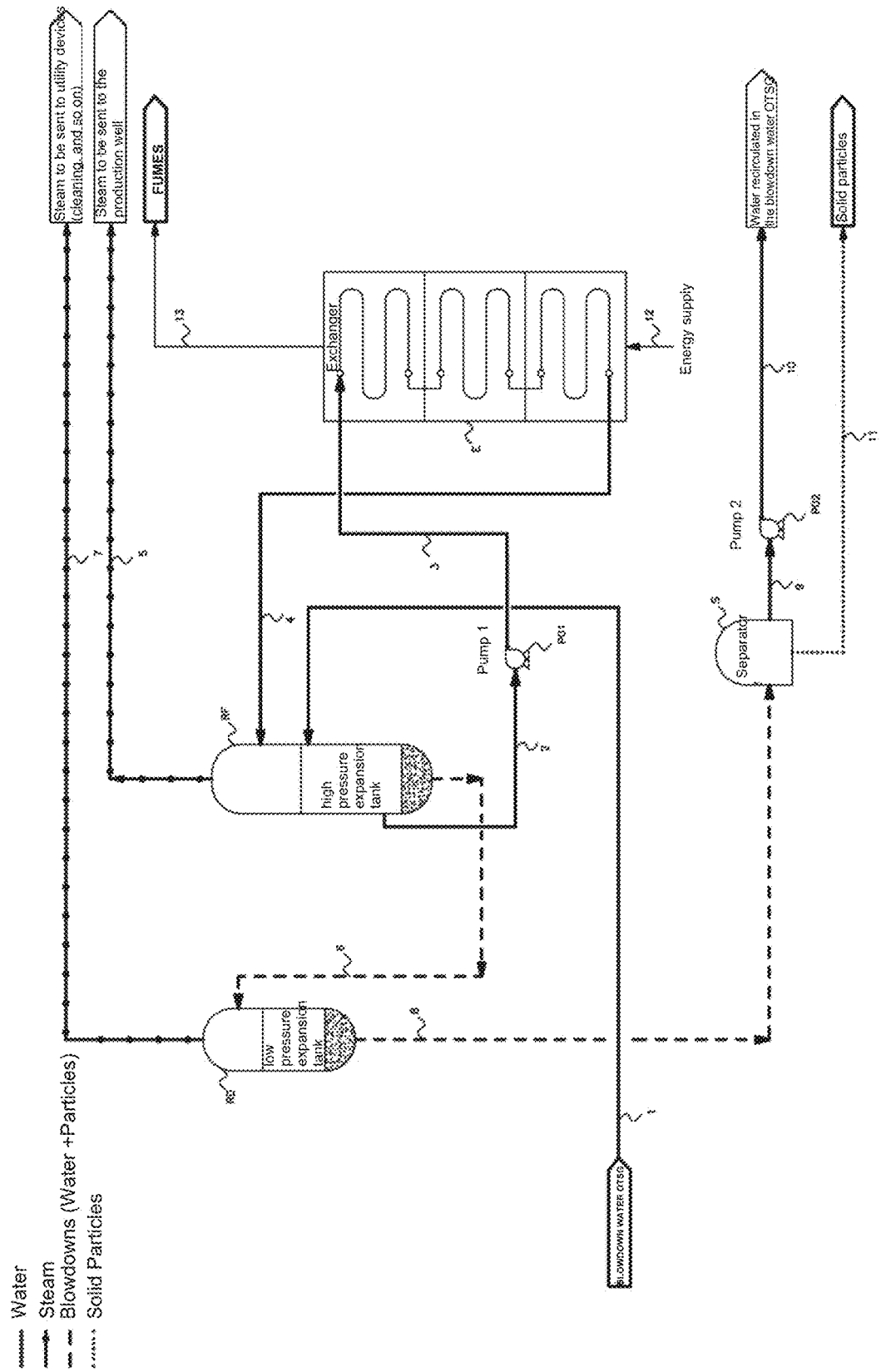

METHOD FOR GENERATING STEAM FROM RAW WATER, IN PARTICULAR FROM BLOW DOWN WATER COMING FROM A STEAM GENERATOR

CROSS REFERENCE TO RELATED APPLICATIONS

Applicant claims priority under 35 U.S.C. 119 of French patent application no. 1458553 filed on Sep. 11, 2014.

BACKGROUND OF THE INVENTION

The present invention relates to a method for generating steam from a raw water containing solid particles in suspension and mineral materials in solution, particularly from a water leaving a steam generator, such as a forced circulation steam generator, e.g. from the OTSG (Once Through Steam Generator) type.

BRIEF SUMMARY OF THE INVENTION

The Applicant Company has found that such a raw water, having a poor quality, could, thanks to a new method which is the subject-matter of the present invention, generate a steam with a very high efficiency (of the order of 95%) without providing reagents or chemicals. This new method uses a step of instant expansion ("flash") in a so-called high pressure tank.

By decoupling heating and phase changing processes, the "flash" process contemplated according to the invention provides a solution to the steam generation problem from a water having a bad quality. First, the heat transfer is performed without boiling in the high pressure water, which high pressure water will then be expanded in an instant expansion tank where the water-steam separation is performed. Inasmuch as the heat flow during the heating remains under the critical limit, no boiling will happen and the heat exchanger will remain free of any deposit. The control of this heat flow is performed by a staged combustion with intermediate cooling which also provides the advantage of significantly reducing the maximum temperatures where $NO_x$ are generated. As a result, a very low $NO_x$ emission, lower than 10 ppm, is obtained.

The so obtained steam is at a pressure sufficient to be used for example to be injected into an oil production well.

According to the invention, it is also possible to provide advantageously another expansion step in a low pressure "flash" expansion tank fed with the blowdown of the high pressure expansion tank and leading to a vapor which can be used for utility devices, such as cleaning devices of various plants, etc.

Thus, the present invention achieves an energetic optimization by providing a main high pressure steam and a complementary steam (secondary steam).

The present invention relates first to a method for generating steam from a feed water containing solid particles in suspension and mineral materials in solution, wherein the method comprises the following steps:

(A) directing said feed water into liquid phase water contained in an instant expansion tank, the instant expansion tank containing a liquid fraction of water and a non-liquid fraction of water;

(B) in said instant expansion tank, heating said feed water by mixing with the recycled stream from following step (E);

(C) compressing again at a high pressure the liquid fraction in said instant expansion tank and sending the liquid fraction to the inlet of a heat exchanger or a group of heat exchangers connected in series;

(D) heating the non-expanded fraction in said heat exchanger(s) while maintaining the non-expanded fraction in the liquid state;

(E) recycling the stream from step (D) in said instant expansion tank;

(F) in said instant expansion tank, expanding said fraction from step (E) and generating by instant expansion a stream of the steam containing the mineral materials of the feed water which remained in solution; and (G) separating the solid particles at the bottom of said instant expansion tank and consisting in the suspended solid particles in the feed water and those formed from:
  the precipitation of the mineral materials in solution under the action of temperature and/or pressure in said instant expansion tank; and
  the decantation associated with the mineral materials derived from the vaporization in said instant expansion tank;
as a blowdown containing water and said particles.

During normal operation, steps (B) and (F) are performed simultaneously.

The following step can further be performed:
(H) directing the blowdown from step (G) to a secondary instant expansion tank to obtain:
  a secondary stream of the searched steam; and
  a secondary blowdown containing water and solid particles of the blowdown of the step (G) which have been decanted in said secondary instant expansion tank.

The feed water can consist in blowdown waters of a forced circulation steam generator, particularly of the OTSG type.

In step (A), the feed water can be directed to the instant expansion tank at a temperature from 80° to 310° C. and at a pressure from $50 \times 10^5$ to $110 \times 10^5$ Pa (50 to 110 bars).

In step (B), the feed water can be heated at a temperature from 80° to 300° C. and at a pressure from $70 \times 10^5$ to $100 \times 10^5$ Pa (70 to 100 bars).

In step (C), the non-expanded fraction can be compressed again at a high pressure from $120 \times 10^5$ to $180 \times 10^5$ Pa (120 to 180 bars).

In step (D), the non-expanded fraction can be heated in said heat exchanger(s) at a temperature from 320 to 350° C.

In step (H), the non-expanded fraction can be compressed again at a pressure from $2 \times 10^5$ to $4 \times 10^5$ Pa (2 to 4 bars).

The secondary blowdown or a least a part of the secondary blowdown can be sent to a separating step in order to obtain:
  solid particles to be discharged; and
  a water which contains mineral materials in solution and which is particularly intended for being recycled in the feed water by a recirculation pump.

In step (D), energy can be supplied to the exchanger or the exchangers in series following a same circuit entering the exchanger or the first exchanger of the series and leaving the exchanger or the last exchanger as fumes.

According to a particular embodiment of the method for generating steam of the invention, comprising steps (A) to (H):
  the feed water is sent under a pressure from $110 \times 10^5$ to $120 \times 10^5$ Pa (110 to 120 bars), at a temperature from 201 to 280° C., in the liquid phase of the instant expansion tank in which it is heated again by mixing with the recycled water fraction compressed under a high pressure from $70\times10^5$ to $100\times10^5$ Pa (70 to 100 bars) in step (D) and heated in the heat exchanger or exchangers at a temperature from 320 to 350° C.; and the steam generated in the instant expansion step (H) in the secondary instant expansion tank being generated at a temperature from 100 to 120° C. and under a pressure from $3\times10^5$ to $4\times10^5$ Pa (3 to 4 bars).

BRIEF DESCRIPTION OF THE DRAWING

The following Example illustrates the invention, without limiting its scope, and corresponds to the embodiment shown on the single FIG. 1 of the appended drawing.

DETAILED DESCRIPTION OF THE INVENTION

In this embodiment, blowdown water from a forced circulation steam generator of the OTSG type is directed by a piping 1 in an expansion tank RF (so-called high pressure expansion tank) at the liquid phase contained in this tank.

In the liquid phase of the expansion tank RF, the water stream undergoes a heating due to the mixing with a fraction of the recirculated water 4 in order to form at the liquid phase outlet of the expansion tank RF:
  a recirculated water, sent by a piping 2 to a pump PO1 (PUMP 1) which transfers it, at a temperature T1 from 250 to 300° C. and under a pressure P1 of 70 to 100 bars, to a set of heat exchangers mounted in series E by a piping 3;
  a blowdown formed by water and solid particles in the lower part, sent by a piping 6 to a degasser expansion tank RD.

The water transferred by the pump PO1 to the set of heat exchangers mounted in series E is gradually heated in this set E by a supply of energy 12 in order to form, at the outlet of the set E, a water heated at a temperature T2 from 320 to 350° C. and under a pressure P2 from 120 to 180 bars supplied via a piping 4 in the gaseous phase of the expansion tank RF to undergo therein an instant vaporization.

In the gaseous phase of the expansion tank RF, the heated water stream 4 undergoes an instant vaporization in order to form at the outlet of the expansion tank RF:
  steam at a pressure P3 from 70 to 100 bars in the upper part, to be sent by a piping 5 to an oil production well;
  water to be recirculated and to be sent by the piping 2;
  the blowdown formed by water and solid particles in the lower part, sent by the piping 6 to the low pressure expansion tank RD.

In the low pressure expansion tank RD, the blowdown of the expansion tank RF supplied by the piping 6 undergoes an instant vaporization in order to form, in the upper part, steam to be sent by a piping 7 to utility devices: cleaning, etc.

A blowdown is formed in the lower part of the low pressure expansion tank RD and is sent into a piping 8.

The blowdown from piping 8 is sent to a separator S where it is separated in order to form, at the outlet of the separator S, on the one hand solid particles 11 which are discarded and on the other hand separated water 9 sent to a pump PO2 (PUMP 2) which transfers it to the feed water tank of the steam generator OTSG.

In the set E, the heated water from the piping 3 is gradually heated in order to heat the water at the desired temperature without inducing any boiling during the heating, which could deposit solid particles in the set E.

It can be noted that only one heat exchanger could be used instead of the set E of heat exchangers mounted in series.

On the unique FIGURE of the appended drawing, the fume outlet 13 is shown at the outlet of the circuit of the energy supply (by 12), which is the same for the set E of exchangers.

The invention claimed is:
1. A method for generating steam from a feed water containing solid particles in suspension and mineral materials in solution, wherein the method comprises the following steps:
  (A) directing said feed water into liquid phase water contained in an instant expansion tank, the instant expansion tank containing a liquid fraction of water and a non-liquid fraction of water;
  (B) in said instant expansion tank, heating said feed water by mixing said feed water with a stream recycled from a heat exchanger;
  (C) compressing the liquid fraction in said instant expansion tank and sending the liquid fraction to an inlet of the heat exchanger, the heat exchanger having a non-expanded fraction in a liquid state;
  (D) heating the non-expanded fraction in said heat exchanger while maintaining the non-expanded fraction in the liquid state, the heated non-expanded fraction in the liquid state forming the stream for recycling to said instant expansion tank;
  (E) recycling the stream from step (D) into said instant expansion tank for mixing with said feed water;
  (F) in said instant expansion tank, expanding said stream recycled into said instant expansion tank in step (E) and generating, by instant expansion, a steam stream containing the mineral materials of the feed water; and
  (G) separating solid particles at a bottom of said instant expansion tank, the solid particles at the bottom of said instant expansion tank being comprised of the suspended solid particles in the feed water and further solid particles formed from precipitation of mineral materials in solution under action of temperature and/or pressure in said instant expansion tank, and decantation associated with mineral materials derived from vaporization in said instant expansion tank, the separating being as a blowdown containing water and said solid particles;
  (H) directing the blowdown from step (G) to a secondary instant expansion tank to obtain:
    a secondary steam stream, and
    a secondary blowdown containing water and the solid particles of the blowdown of the step (G) which have been decanted in said secondary instant expansion tank.

2. The method according to claim 1, wherein the feed water comprises blowdown waters of a forced circulation steam generator.

3. The method according to claim 1, wherein in step (A), the feed water is directed to the instant expansion tank at a temperature from 80° to 310° C. and at a pressure from $50\times10^5$ to $110\times10^5$ Pa (50 to 110 bars).

4. The method according to claim 1, wherein in step (B), the feed water is heated at a temperature from 80° to 300° C. and at a pressure from $70\times10^5$ to $100\times10^5$ Pa (70 to 100 bars).

5. The method according to claim 1, wherein in step (C), the liquid fraction is compressed at a high pressure from $120\times10^5$ to $180\times10^5$ Pa (120 to 180 bars).

6. The method according to claim 1, wherein in step (D), the non-expanded fraction is heated in said heat exchanger at a temperature from 320° to 350° C.

7. The method according to claim 1, wherein in step (H), a non-expanded fraction of the secondary blowdown is compressed at a low pressure from $2 \times 10^5$ to $4 \times 10^5$ Pa (2 to 4 bars).

8. The method according to claim 1, wherein the secondary blowdown or a least a part of the secondary blowdown is sent to a separating step in order to obtain:
   solid particles to be discharged, and
   a water which contains mineral materials in solution and which is particularly intended for being recycled in the feed water by a recirculation pump.

9. The method according to claim 6, wherein in step (D), the heat exchanger is a single heat exchanger or plural heat exchangers connected in series, energy is supplied to the heat exchanger or the plural heat exchangers connected in series following a same circuit entering the exchanger or a first exchanger of the plural heat exchangers connected in series and leaving the exchanger or a last exchanger of the plural heat exchangers connected in series as fumes.

10. The method according to claim 1, comprising steps (A) to (H), wherein:
   the feed water is sent under a pressure from $110 \times 10^5$ to $120 \times 10^5$ Pa (110 to 120 bars), at a temperature from 210° to 280° C. into the liquid phase water of the instant expansion tank in which the feed water is further heated by mixing with the stream recycled from the heat exchanger compressed under a high pressure from $70 \times 10^5$ to $100 \times 10^5$ Pa (70 to 100 bars) in step (D) and heated in the heat exchanger at a temperature from 320° to 350° C., and
   the secondary steam stream generated in step (H) in the secondary instant expansion tank is generated at a temperature from 100° to 120° C. and under a pressure from $3 \times 10^5$ to $4 \times 10^5$ Pa (3 to 4 bars).

11. The method according to claim 1, wherein the feed water comprises blowdown waters of a forced circulation once through steam generator.

12. The method according to claim 1, wherein the heat exchanger is comprised of plural heat exchangers connected in series.

* * * * *